United States Patent [19]

Sekine et al.

[11] Patent Number: 5,013,952

[45] Date of Patent: May 7, 1991

[54] PRECISION BRUSH MOUNTING ASSEMBLY FOR SMALL ELECTRIC MOTOR

[75] Inventors: Shuji Sekine; Takeo Furuya; Naoto Harada, all of Yokohama, Japan

[73] Assignee: Jidosha Denki Kogyo K.K., Kanagawa, Japan

[21] Appl. No.: 482,571

[22] Filed: Feb. 21, 1990

[30] Foreign Application Priority Data

Feb. 22, 1989 [JP] Japan ................. 1-20063[U]

[51] Int. Cl.⁵ .................. H02K 5/14; H01R 39/39
[52] U.S. Cl. ..................... 310/239; 310/244
[58] Field of Search ........... 29/513, 596; 310/40 MM, 310/43, 83, 239, 242, 244

[56] References Cited

U.S. PATENT DOCUMENTS 4,746,829  5/1988  Strobl ................. 310/239
4,851,730  7/1989  Fushiya ............... 310/242

FOREIGN PATENT DOCUMENTS 876721  7/1949  Fed. Rep. of Germany ........ 29/513
141523  5/1980  Japan ......................... 310/244

Primary Examiner—Steven L. Stephan
Assistant Examiner—D. L. Rebsch
Attorney, Agent, or Firm—Sughrue, Mion, Zinn, Macpeak & Seas

[57] ABSTRACT

A small-sized electric motor includes a terminal with a positioner, complementary to a positioner on a brush holder equipped with a brush, for fastening the brush holder to the terminal by deformation of one positioner relative to the other, and a projection with a bendable piece for securing the terminal to a holder base by bending the bendable piece after it is inserted into a terminal hole.

2 Claims, 4 Drawing Sheets

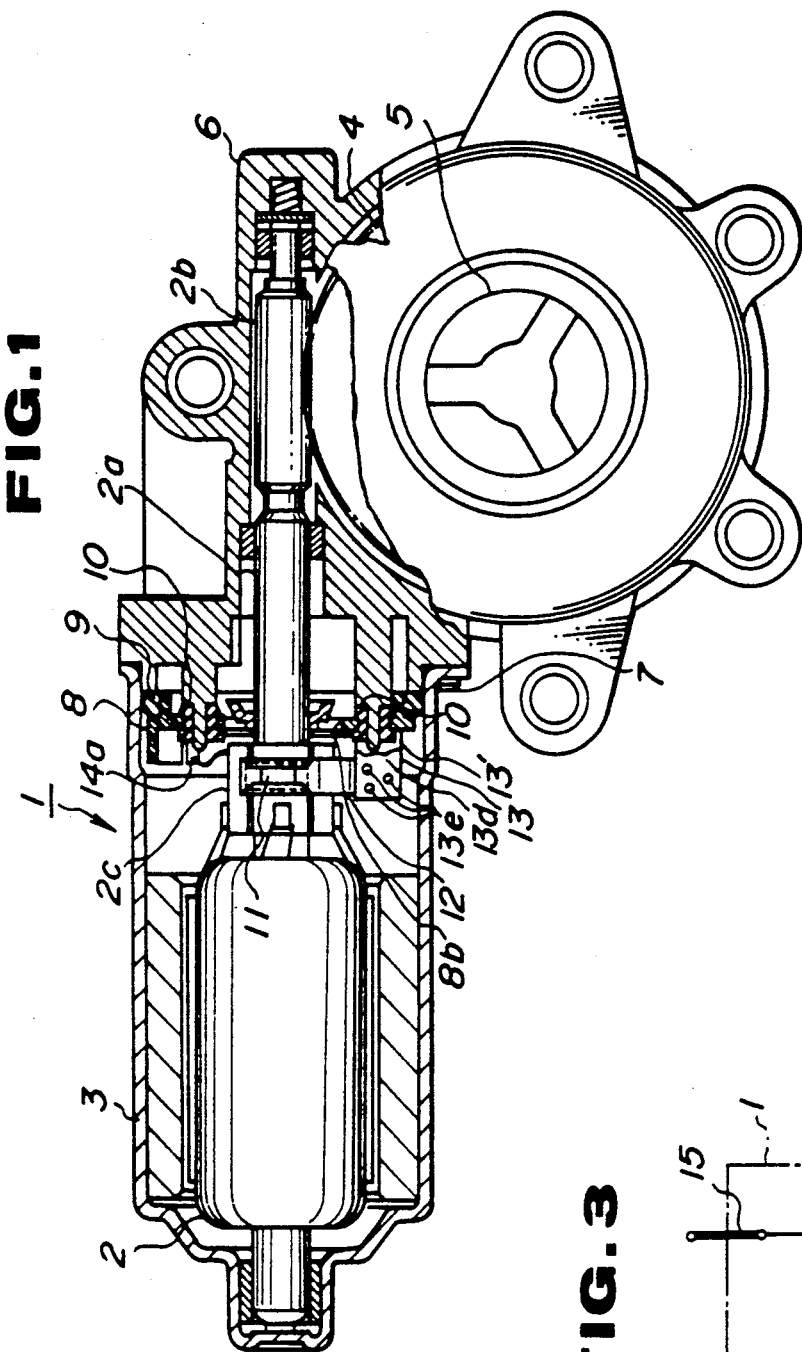
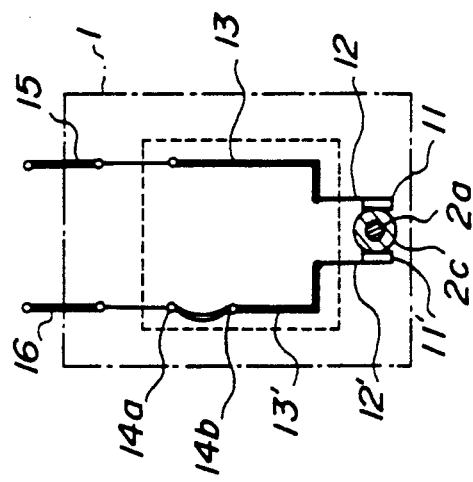

PRECISION BRUSH MOUNTING ASSEMBLY FOR SMALL ELECTRIC MOTOR

BACKGROUND OF THE INVENTION

1. Field Of The Invention

The invention relates to a small-sized electric motor used for, for example, driving a window glass in a power window system of an automobile, and in particular to a fitting structure for a brush supplying an electric current to a commutator on an armature.

2. Description Of The Prior Art

Heretofore, such a brush of a small-size electric motor has been installed to the motor as shown in FIG. 6 and FIG. 7.

That is, a small-sized electric motor 100 shown in FIGS. 6 and 7 is provided with an armature 102 rotatably in the motor case 101 and with a gear case 104 united with the motor case 101 by bolts 103. An armature shaft 102a of the armature 102 passes through an armature shaft hole 104a provided in the gear case 104 and a worm 102b is provided on the armature shaft 102a protruding from the side of the motor case 101. The worm 102b of the armature shaft 102a meshes with a worm wheel 105 housed rotatably in a cavity 104b of the gear case 104 and fixed to an output shaft 106.

The motor 100 is provided with a holder base 107 fixed on the left end of the gear case 104 in FIG. 6 by an annular projection 101a formed on the inner periphery of the motor case 101. Brushes 108 and 108', for supplying an electric current to the armature 102 by contact with a commutator 102c of the armature 102, are fitted to one end of respective brush holders 109 and 109', and another end of respective brush holders 109 and 109' are fixed to respective terminals 111 and 111' through joints 110 and 110' welded by spot welding, for example.

The respective terminals 111 and 111' (In FIG. 7, one the terminal 111 is shown since the terminal 111' is similar to the terminal 111.) are fixed to the holder base 107 by pressing projections 111a (and 111a') provided on the terminals 111 (and 111') on the side of the holder base 107 into terminal holes 107a (and 107a') provided on the holder base 107 forcing pawls 111b (and 111b') formed on projections 111a (111a') to bite into side walls 107b (and 107b') of the terminal holes 107a (and 107a').

Upon supplying a prescribed electric current through external wiring 112 and 113 connected to the respective terminals 111 and 111' by changing a switch (not shown), the electric current flows from one side terminal 111 to the other side terminal 111' through the brush holder 109, the brush 108, the commutator 102c, the armature 102, the commutator 102c, the brush 108' and the brush holder 109', the armature 102 rotates. Thereby, the worm wheel 105 meshed with the worm 102b provided an the armature shaft 102a of the armature 102 rotates together with the output shaft 106, and a window glass linked with the output shaft 106 can be driven in the opening or closing direction according to the changing of the switch in the case of applying the motor 100 to a power window system, for example.

However, in the conventional fitting structure for the brushes 108 and 108' the small-sized electric motor 100, because the respective brush holders 109 and 109' fitted with the brushes 108 and 108' are fixed to the respective terminals 111 and 111' through the joints 110 and 110' formed by welding such as spot welding, there is a decreasing tendency in the positioning accuracy at the time of placing the brushes 108 and 108' into contact with the commutator 102c of the armature 102. Therefore, there is a problem, since it is difficult to correct the brushes 108 and 108' into the predetermined position when the deviation occurs in the setting position. Furthermore, because the respective terminals 111 and 111' are fixed to the holder base 107 by pressing projections 111a and 111a' into terminal holes 107a and 107a' provided to the holder base 107 and forcing pawls 111b and 111b' formed on the respective projections 111a and 111a' to bite into side walls 107b and 107b' of the terminal holes 107a and 107a' there is another problem, since there is the possibility that the holder base 107 is deformed by the high stress applied on the side walls 107b and 107b' of the terminal hole 107a and 107a' at the time of pressing the respective projections 111a and 111a' into the terminal holes 107a and 107a'. Accordingly, there have been strong requirements to improve the positioning accuracy at the time of fixing the brush holder to the terminal and to reduce the stress applied on the holder base at the time of fixing the terminal to the holder base.

SUMMARY OF THE INVENTION

Therefore, this invention is made in view of the aforementioned problems of the prior art, and an object of the invention is to provide a small-sized electric motor having brush-fitting structure which is free from positional deviation at the time of fixing a brush holder to a terminal and free from high stress to be applied on a holder base at the time of fixing a terminal to a holder base.

The constitution of the small-sized electric motor according to this invention for attaining the above-mentioned object is characterized by having a brush holder equipped with a brush for supplying an electric current to an armature through a commutator, a terminal fixed with the brush holder for supporting said brush holder and provided with a projection, a holder base provided with a terminal hole for fixing said terminal by fitting said projection thereinto, said terminal being provided with a positioner agreeable with a positioner provided to the brush holder for fastening the brush holder to the terminal by caulking, and said projection being provided with a bendable piece for engaging the holder base by bending said bendable piece inserted into said terminal hole.

In the small-sized electric motor according to this invention, the brush holder is fixed to the terminal by caulking or deforming when the positioner provided on the terminal coincides with the positioner provided on the brush holder, and the terminal is fixed to the holder base when the bendable piece provided on the projection of the terminal is inserted into the terminal hole and is bent so as to be secured to the holder base. Therefore, the positioning accuracy does not deteriorate at the time of fixing the brush holder to the terminal, and the holder base is not applied with immoderate stress at the time of fixing the terminal to the holder base.

BRIEF DESCRIPTION OF THE DRAWINGS

FIG. 1 is a vertical sectional side view illustrating the small-sized electric motor according to an embodiment of this invention;

FIG. 3 is a schematic circuit diagram of the small-sized electric motor shown in FIG. 1;

DESCRIPTION OF THE PREFERRED EMBODIMENT

Figure 2:
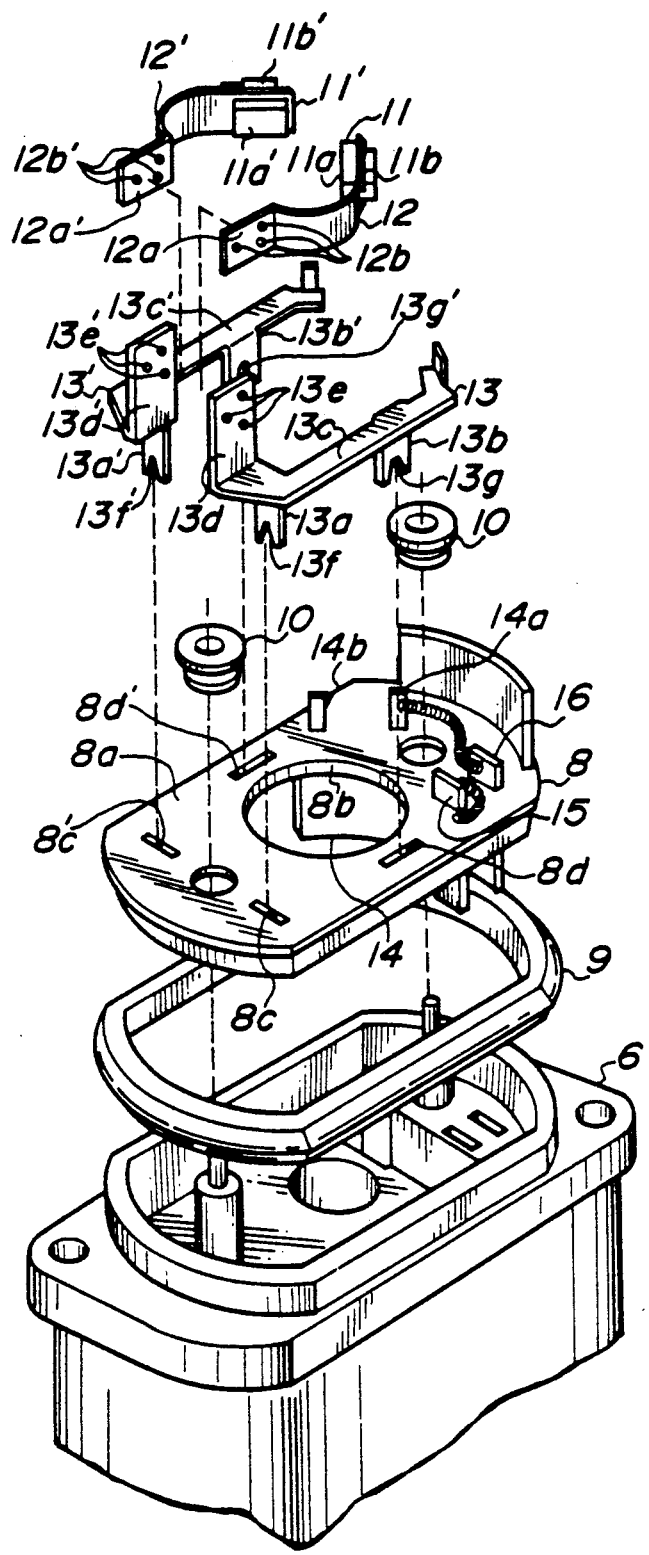
FIG. 2 is a perspective view illustrating the assembling relation of the respective parts in the circumference of the terminal of the small-sized electric motor shown in FIG. 1.

An embodiment of the small-sized electric motor according to this invention will be described below on basis of FIG. 1 to FIG. 5.

That is, a small-sized electric motor 1 shown in the figures is provided with an armature 2 rotatably mounted in a motor case 3 on the left side in FIG. 1, and provided with a worm wheel 4 meshed with a worm $2b$ formed on an armature shaft $2a$ of the armature 2 protruding from the motor case 3 into a gear case 6. An output shaft 5 is coaxially mounted on the worm wheel 4 in the case 6 the right side of the motor case 3 in FIG. 1, and said motor case 3 is fixed to the gear case 6 by bolts 7.

A holder base 8 is fixed on the left end of the gear case 6 in FIG. 1 through an annular damper 9 and a grommet-shaped dampers 10. Bushes 11 and 11' for supplying an electric current to the armature 2 by contacting with a commutator $2c$ of the armature 2 are retained by the holder base 8 by fastening them to terminals 13 and 13' through brush holders 12 and 12'.

Said holder base 8 is provided with an opening $8b$ for the passage of with the armature shaft $2a$ of the armature 2 in the center of a holder body $8a$ having a oval-shaped external form as shown in FIG. 2, and is fitted with the grommet-shaped dampers 10 and 10 on the upper and the lower side of said opening $8b$ in FIG. 1 and fitted with the annular damper 9 on the lower side of the holder body $8a$.

Furthermore, the holder base 8 is provided with respective terminals $14a$ and $14b$ of a circuit breaker 14 fixed on the right side of the opening $8b$ provided in the holder body $8a$ in FIG. 2 and with respective connectors 15 and 16 adapted to be connected to the outside. The holder base 8 is provided with terminal holes $8c$, $8d$, $8c'$ and $8d'$ for inserting respective projections $13a$, $13b$, $13a'$ and $13b'$ of the terminals 13 and 13'.

On the one side, both the brushes 11 and 11' are carbonaceous electric conductors and are provided with contact faces $11a$ and $11a'$ adapted to be in contact with the commutator $2c$ of the armature 2 on the inner sides thereof in FIG. 2 and provided with tip parts $11b$ and $11b'$ for fitting to the brush holders 12 and 12' (which will be described later) on the outer sides thereof in FIG. 2.

On the other side, both the brush holders 12 and 12 are made up of electric conductive plate and have some elasticity, and are fitted with the tip parts $11b$ and $11b'$ of said brushes 11 and 11' at respective ends. Furthermore, said brush holders 12 and 12' are provided with flat-shaped fixing parts $12a$ and $12a'$ for fixing terminals 13 and 13' at respective ends thereof, and said fixing parts $12a$ and $12a'$ are provided with positioners $12b$ and $12b'$ which comprise three openings spaced from each other, respectively in this embodiment.

Additionally, both the terminals 13 and 13' are made up of electrically conductive plates and have flat shape, provided with fixing parts $13d$ and $13d'$ protruding upwardly in FIG. 2 and for fixing the fixative parts $12a$ and $12a'$ provided to the respective brush holders 12 and 12' at ends of elongate-shaped terminal bases $13c$ and $13c'$. Said fixing parts $13d$ and $13d'$ are provided on the sides to be engaged with the respective brush holders 12 and 12' with positioners $13e$ and $13e'$ which comprise three projections complementary to the opening $12b$ and $12b'$ of the brush holder 12 and 12' and which are secured thereto by caulking or deforming the projections in this embodiment.

Said terminals 13 and 13' are provided with projections $13a$, $13b$, $13a'$, $13b'$ protruding downwardly from two places on the respective terminal bases $13c$ and $13c'$ in FIG. 2 corresponding to the respective terminal holes $8c$, $8d$, $8c'$ and $8d'$ provided in said holder base 8. The projections $13a$, $13b$, $13a'$ and $13b'$ are provided On the lower ends in FIG. 2 with bendable pieces $13f$, $13g$, $13f'$, and $13g'$ for securing the respective terminals 13 and 13' to the holder base 8 by bending them after inserting into said respective terminal holes $8c$, $8d$, $8c'$ and $8d'$.

Figure 4:
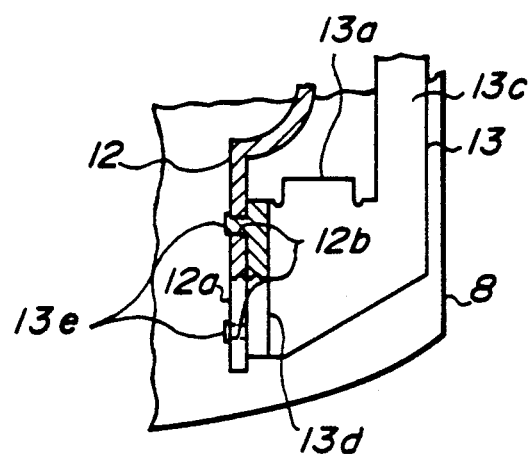
FIG. 4 and FIG. 5 are a segmentary side view and a segmentary bottom view illustrating the assembled state of the terminal, the brush holder and the holder base of the small-sized electric motor shown in FIG. 1 respectively.

The assembling procedure for the holder base 8, the brush holder 12, and the terminal 13 will be explained below in more detail on basis of FIG. 4 and FIG. 5. The positioner $13e$ provided on the fixing part $13d$ of the terminal 13 extrudes leftwardly in FIG. 4, the brush holder 12 is fixed to the terminal 13 by caulking or deforming the positioner $13e$ on the left side of the brush holder 12 in FIG. 4 when the positioner $12b$ provided on the fixing part $12a$ of the brush holder 12 is made to coincide with said positioner $13e$ of the terminal 13 in the rightward direction from the left side in FIG. 4.

Figure 5:
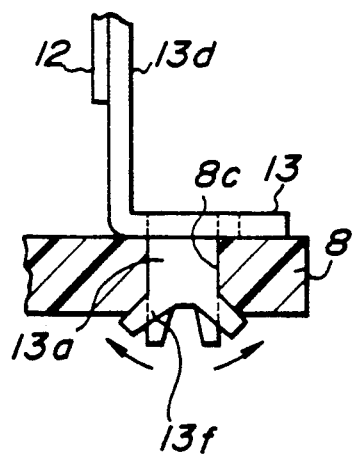
Figure 6:
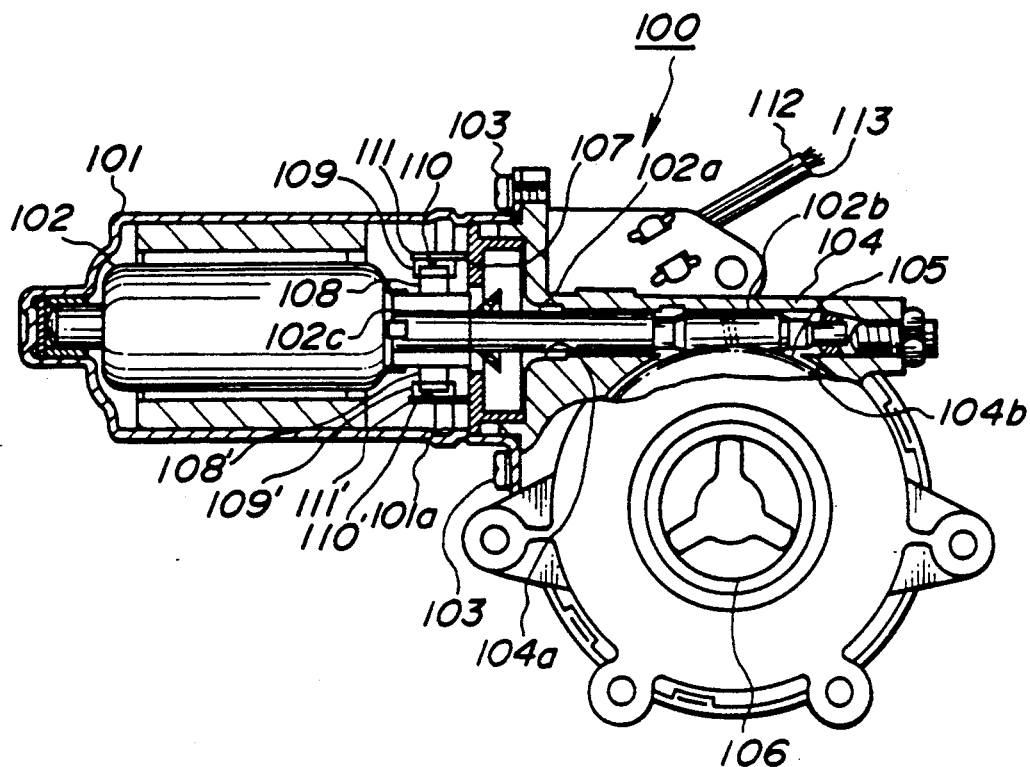
FIG. 6 is a vertical sectional side view of the conventional small-sized electric motor.
Figure 7:
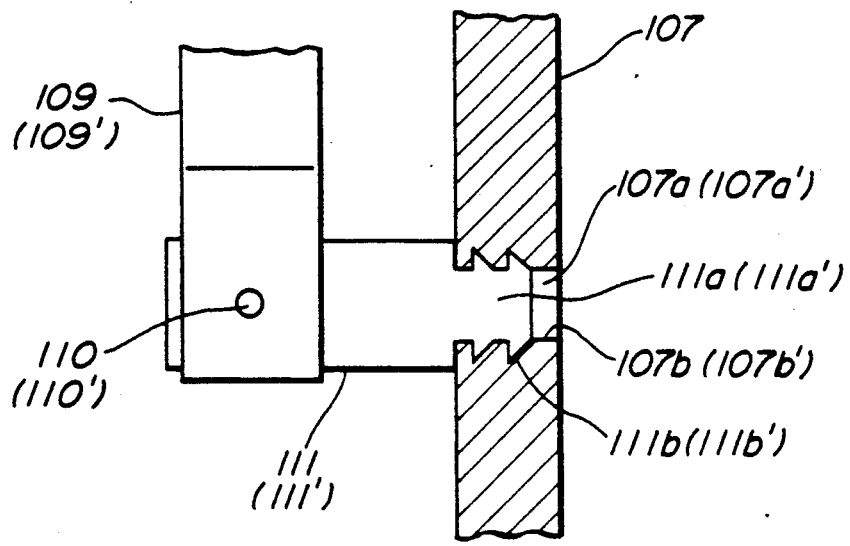
FIG. 7 is a segmentary side view illustrating the circumference of the terminal of the small-sized electric motor shown in FIG. 6.

Terminal 13 is secured to the holder base 8 by pressing the bendable piece $13f(13g)$ provided on the projection $13a$ ($13b$) upwardly in FIG. 5 with a bending jig (not shown) and bending it in the direction of the arrow shown with a solid line in FIG. 5 when the projection $13a$ (which is similar to the projection $13b$, so the projection $13b$ is not shown) provided on the terminal 13 is inserted into the terminal hole $8c(8d)$ provided in the holder base 8.

Furthermore, another brush holder 12' and another terminal 13 which are not shown in the figures are also fastened to the holder base 8 similarly to the brush holder 12 and the terminal 13.

In addition to above, the terminal 13 is connected to the connector 15 fixed to the holder base 8 and another connector 16 is connected to the terminal $14a$ of the circuit breaker 14 fixed on the holder base 8, and another terminal $14b$ of the circuit breaker 14 is connected to another terminal 13'.

In this state, supplying the prescribed electric current from the connector 15 to another connector 16 by changing a switch (not shown), the electric current flows in the circuit of the connector 15→ terminal 13→ brush holder 12→ brush 11→ commutator $2c$ → armature 2→ commutator $2c$→ another brush 11'→ another brush holder 12'→ another terminal 13'→ another terminal $14b$ of the circuit breaker 14→ terminal $14a$ of the circuit breaker 14→ another connector 16. Thereby the armature 2 rotates and the worm wheel 4 meshed with the worm 2b provided on the armature shaft 2a of the armature 2 rotates, so that the output shaft 5 rotates.

As described above, the small-sized electric motor according to this invention has the constitution comprising a terminal provided with a positioner agreeable with a positioner provided to a brush holder for fastening the brush holder thereto by caulking, and a projection provided with a bendable piece for engaging to a holder base by bending said bendable piece inserted into said terminal hole. Therefore, it is possible to fasten the brush holder to the terminal without deterioration in the positioning accuracy, and the deformation of the holder base is prevented because it is possible to fix the terminal to the holder base without subjecting the holder base to undue stress. Accordingly, an excellent effect is obtained since it is possible to improve the productivity and the quality of the product.

What is claimed is:

1. A precision brush mounting assembly for a small electric motor having a motor casing substantially surrounding a motor and a gear case secured at one end to said motor casing, said assembly comprising:

a holder base supported on said gear case by grommet-shaped damper means and provided with a plurality of terminal receiving holes;

a terminal having a projection with bendable means on the end thereof, said projection extending into said terminal receiving hole and being secured therein by said bendable means being bent into contact with said holder base, said terminal being further provided with brush holder engaging means having a plurality of first positioner means; and a brush holder having a brush thereon for supplying an electric current to an armature of the motor through a commutator, said brush holder having terminal engaging means having a plurality of second positioner means thereon complementary to said first positioner means with said first and second positioner means being engaged and secured to each other by deformation of one of said positioning means relative to the other positioning means.

2. A precision brush mounting assembly for a small electric motor as set forth in claim 1, further comprising annular damper means disposed between said holder base and said gear case about a peripheral edge of said holder base.

* * * * *